United States Patent Office 2,976,313
Patented Mar. 21, 1961

2,976,313
METHOD FOR THE PREPARATION OF TRIMETHYL BORATE

Carlos M. Bowman and Edward J. Watson, Midland, Mich., assignors to The Dow Chemical Company, Midland, Mich., a corporation of Delaware No Drawing. Filed Mar. 2, 1959, Ser. No. 796,296

4 Claims. (Cl. 260—462)

This invention relates to a method for the preparation of trimethyl borate. This compound has the formula:

$$B\begin{matrix}-OCH_3\\-OCH_3\\-OCH_3\end{matrix}$$

wherein B is the boron atom.

Most of the known methods for preparing trimethyl borate necessarily involve the separation of the borate from a methanol-trimethyl borate azetrope. This separation of the trimethyl borate is both troublesome and time-consuming. In the method of the present invention, however, trimethyl borate may be prepared whereby the desired product is obtained directly in good yields without the necessity of separating a troublesome azeotrope.

The method of the present invention includes reacting boric oxide, $B_2O_3$, with a compound selected from the group consisting of 1,1-dimethoxycyclohexane and 2,5-dimethoxy-2,5-dimethyl-1,4-dioxane, having the respective formulae:

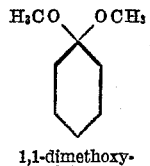
1,1-dimethoxy-cyclohexane

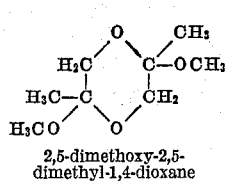
2,5-dimethoxy-2,5-dimethyl-1,4-dioxane and heating the reaction mixture to a temperature preferably between about 0° C. and about 100° C., desirably to the distillation temperature of trimethyl borate, which is in the range of 68°–70° C. at atmospheric pressure. The trimethyl borate is then conveniently removed from the reaction mixture by distillation. While the distillation is usually accomplished most conveniently at atmospheric pressure, pressures above or below atmospheric may be employed, if appropriate. Mole ratios of from 1 part boric oxide to 1–1.5 parts of the cyclohexane derivative or dioxane derivative are desirable, although mole ratios of 2 to 1 to 1 to 3 may be employed. The final product may then be purified by redistillation, if desired.

The following examples illustrate the invention but are not to be construed as limiting the invention thereto:

*Example I*

Fifty seven (57) grams (0.4 mole) of 1,1-dimethoxycyclohexane and 28 grams (0.4 mole) of boric oxide were mixed in a 250-milliliter round-bottom flask connected to a distillation column and equipped with a heating mantle. The mixture was heated to 68–70° C. where the first fraction distilled over and was collected. This fraction consisted of 21 grams (50 percent of the theoretical yield) of water-white trimethyl borate, having an index of refraction, $n_D^{25}$, of 1.350.

*Example II*

One hundred (100) grams (0.57 mole) of 2,5-dimethoxy-2,5-dimethyl-1,4-dioxane and 27 grams (0.4 mole) of boric oxide were mixed in a 250-milliliter round-bottom flask equipped similarly to that in Example I. The mixture was heated to 68–70° C. where the first fraction distilled over and was collected. This fraction consisted of 24 grams (60 percent of the theoretical yield) of water-white trimethyl borate, having an index of refraction, $n_D^{25}$, of 1.350.

Various modifications may be made in the present invention without departing from the spirit or scope thereof, and it is to be understood that we limit ourselves only as defined in the appended claims.

We claim:
1. A method for preparing trimethyl borate comprising, reacting, at a temperature of between about 0° C. and about 100° C., boric oxide with a compound selected from the group consisting of 1,1-dimethoxycyclohexane and 2,5-dimethoxy-2,5-dimethyl-1,4-dioxane, and separating the resulting trimethyl borate from the reaction mixture.

2. A method for preparing trimethyl borate comprising, reacting, at a temperature of between about 30° C. and about 80° C., boric oxide with a compound selected from the group consisting of 1,1-dimethoxycyclohexane and 2,5-dimethoxy-2,5-dimethyl-1,4-dioxane, and separating the resulting trimethyl borate from the reaction mixture.

3. A method for preparing trimethyl borate comprising, reacting, at a temperature of between about 0° C. and about 100° C., boric oxide with 1,1-dimethoxycyclohexane, and separating the resulting trimethyl borate from the reaction mixture.

4. A method for preparing trimethyl borate comprising, reacting, at a temperature of between about 0° C. and about 100° C., boric oxide with 2,5-dimethoxy-2,5-dimethyl-1,4-dioxane and separating the resulting trimethyl borate from the reaction mixture.

No references cited.